United States Patent
Dimou

[19]

[11] Patent Number: 6,100,793
[45] Date of Patent: Aug. 8, 2000

[54] INTEGRATED VEHICLE AND BUILDING ALARM SYSTEM

[76] Inventor: George A. Dimou, 263 Commack Rd., Deer Park, N.Y. 11729

[21] Appl. No.: 09/241,479

[22] Filed: Feb. 1, 1999

[51] Int. Cl.[7] .................................................. B60R 25/10
[52] U.S. Cl. ........................ 340/426; 340/547; 340/427; 340/431; 340/984; 379/37; 379/40; 379/42; 379/44; 307/10.1; 307/10.2
[58] Field of Search ..................... 340/426, 547, 340/427, 431, 984; 379/37, 40, 42, 44; 307/10.1, 10.2

[56] References Cited

U.S. PATENT DOCUMENTS

| | | | |
|---|---|---|---|
| 3,253,270 | 5/1966 | Downer | 340/280 |
| 3,646,580 | 2/1972 | Fuller et al. | 325/53 |
| 3,683,366 | 8/1972 | Turpin, Jr. | 340/325 |
| 3,688,256 | 8/1972 | D'Ausilio et al. | 340/63 |
| 3,898,641 | 8/1975 | Banner | 340/280 |
| 4,125,826 | 11/1978 | Rasmussen et al. | 340/63 |
| 4,257,038 | 3/1981 | Rounds et al. | 340/539 |
| 4,804,937 | 2/1989 | Barbiaux et al. | 340/52 F |
| 4,924,206 | 5/1990 | Ayers | 340/426 |
| 5,319,698 | 6/1994 | Glidewell et al. | 379/39 |
| 5,673,021 | 9/1997 | Woods | 340/547 |
| 5,870,020 | 2/1999 | Harrison, Jr. | 340/426 |

*Primary Examiner*—Daniel J. Wu
*Assistant Examiner*—Tai T. Nguyen
*Attorney, Agent, or Firm*—Collard & Roe, P.C.

[57] ABSTRACT

1. An integrated vehicle and building alarm system for protecting at least one vehicle located adjacent a building, comprising at least one vehicle alarm device, located within the vehicle, having means for detecting an intrusion into the vehicle, means for producing an audible alert in response to said intrusion, and means for activating an alarm signal when said intrusion occurs. The system also comprises a building alarm device having a plurality of input ports corresponding to a number of protected zones, the device is located within the building and has means for detecting the alarm signal on the input ports. In addition, the device has means for generating an alert signal when an alarm signal occurs. A junction box, having at least one input port and at least one output port, is located inside the building. An attachment cable is electrically connected between the vehicle alarm device and the input port of the junction box. Also, at least one alarm signal line is electrically connected between the output port of the junction box and the input port of the building alarm device. Finally, there are alert means for drawing attention to the area of the intrusion is electrically connected to the building alarm device which are actuated by the alert signal generated by the building alarm device.

14 Claims, 2 Drawing Sheets

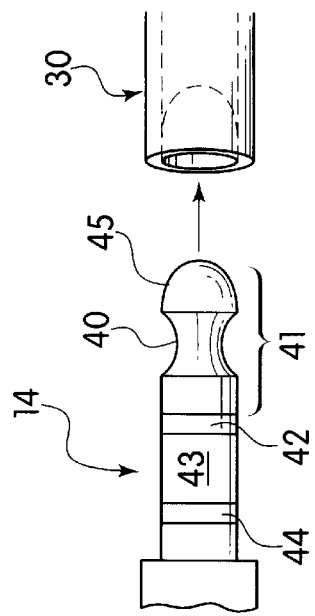
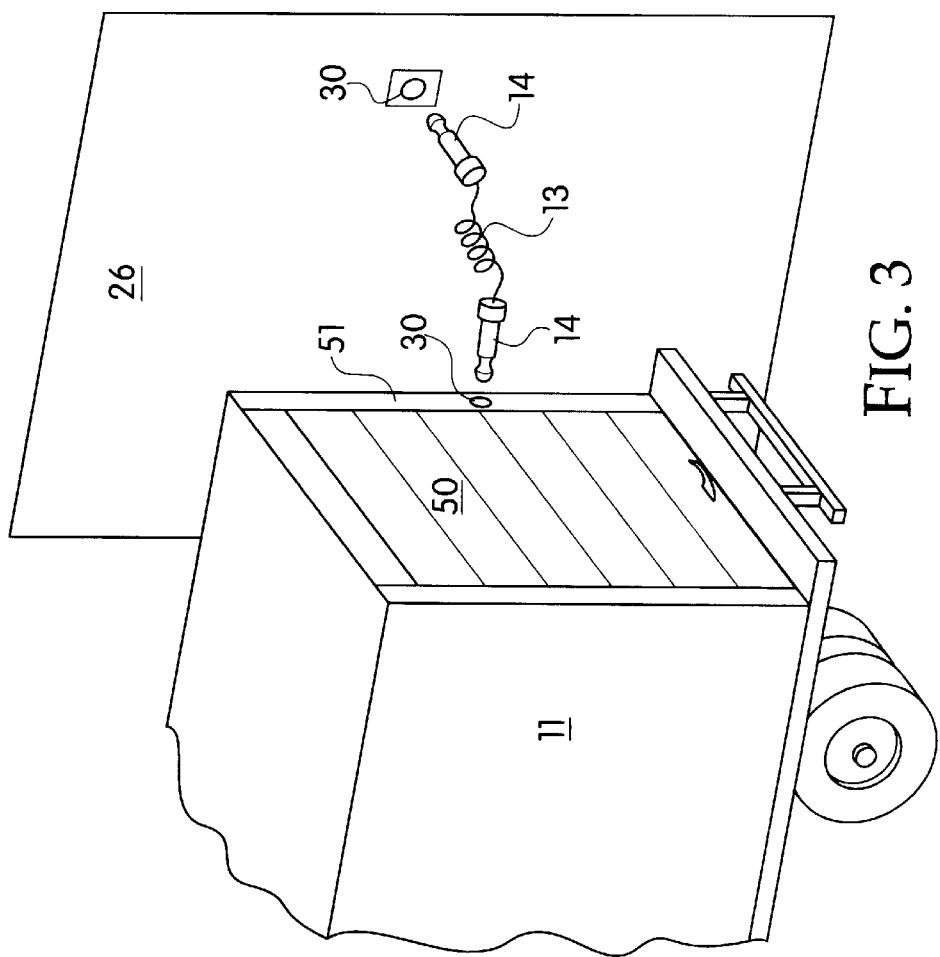

INTEGRATED VEHICLE AND BUILDING ALARM SYSTEM

BACKGROUND OF THE INVENTION

1. Field of the Invention

The present invention relates to an intrusion alarm system. In particular, the invention relates to a vehicle intrusion alarm system which is attached to, and works in conjunction with, a building's alarm system.

2. The Prior Art

Many vehicles carry valuable cargo, ranging from tools to products (e.g., plumber's tools, television repairman's equipment, salesman's samples, telephone equipment, etc.); and in many cases, it is impracticable to unload the vehicle every night.

It is becoming increasingly more difficult to prevent pilferage from these parked vehicles and many schemes have been suggested for solving this problem. Unfortunately, most of these prior art schemes are complex, expensive, and subject to human error.

The present intrusion alarm system solves the above problems in a simple, fool-proof manner.

The following brief discussion of the prior art intrusion systems will provide an understanding of the problems and of the operation and advantages of the disclosed system. For ease of comprehension, it will be presented in terms of a truck parked on a parking lot, but it will be apparent that the disclosed invention has many other uses.

Many of the prior art intrusion systems provided an alarm when an intruder touched, approached, or passed a given barrier, such as a fence, but gave no alarm if the intruder somehow by-passed the barrier (as, for example, by being within the barrier when the intrusion system was turned on). In cases such as these, parked vehicles and the like could be pilfered at leisure without producing an alarm, the alarm being produced only when the intruder was already escaping with his loot. Some other intrusion systems produced an alarm when a body moved within a predetermined area, but due to the required sensitivity of such a system, the protected area had to be quite small. Other intrusion systems produced an alarm when a vehicle was driven across a given sensor, such as a wire, a lightbeam, an air hose, or the like, but such systems did not give any warning that pilferage was impending. Still other systems had alarms attached to the vehicle proper, the concept being that whenever the vehicle was jarred, the alarm would sound.

U.S. Pat. No. 3,688,256 to D'Ausilio et al. discloses a vehicle intrusion alarm system. The system comprises a transmitter located in each protected vehicle, and a receiver located around the perimeter of a protected area. When an intrusion in a protected vehicle occurs, the transmitter produces a varying magnetic field which is sensed by the receiver. The receiver then generates an alarm signal which either sounds an audible alarm or triggers an automatic dialer. This system has several disadvantages. First, at the start of a business day, the system must be deactivated so that the truck operators are able to enter the vehicles without sounding an alarm. This requirement leaves all the other vehicles unprotected. Second, any similar transmitter disposed outside of the receiver will similarly produce a false alarm. Lastly, the receiver requires a series of pick up loops disposed around the perimeter of a protected area. If the protected area is the parking lot of a large building, this requirement may add significantly to the cost of the system.

U.S. Pat. No. 4,125,826 to Rasmussen et al. discloses an ultrasonic vehicle alarm system. The system comprises a transmitter of ultrasonic energy and a receiver capable of receiving the same. An alarm occurs when either the transmitter is disabled due to an intrusion or the protected device is moved away from the receiver. A major drawback of this system is the requirement for the continual transmission of ultrasonic energy. This requirement draws power from the protected vehicle and is an unnecessary drain on the electrical system.

It is apparent that the available intrusion systems are not completely satisfactory.

SUMMARY OF THE INVENTION

It is an object of the present invention to provide an integrated vehicle and building alarm system which is capable of protecting vehicles from both theft and pilferage of the goods inside the truck.

It is an additional object of the present invention to provide a system which is capable of generating both an audible and visual alarm, as well as contacting the appropriate authorities.

It is a further object of the present invention to provide a system which is both economical and easy to operate and install.

The present invention achieves these objects by providing a system having the protected vehicles connected to a building's main alarm system. Any intrusion in a protected vehicle, either by opening the door or breaking a window, will generate an alarm signal and trigger the building's main alarm. In this manner, the system requires only one zone of the building's main alarm. It is to be understood that each protected vehicle could constitute a protected zone on the building's main alarm. This arrangement would provide an easy determination of which vehicle was broken into.

Each protected vehicle requires a magnetic switch, or other suitable device, located in each protected area. Common protected areas of vehicles include the doors, windows, and engine hood. Any opening of these switches is detected by the vehicle alarm and generates an alarm signal which is detected by the building's main alarm system. An audible and visual alarm is sounded on both the building and the protected vehicle. In addition, an automatic dialer notifies the appropriate authorities. In an effort to prevent further damage to the protected vehicles, the doors of the vehicles are left unlocked. This prevents damage to the windows of the protected vehicles.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views:

FIG. 3 is a three-dimensional view detailing the connection of a protected vehicle to the commercial building; and FIG. 4 is an enlargement of the male quick connect connector located on the attachment cable.

DETAILED DESCRIPTION OF PREFERRED EMBODIMENTS

Figure 1:
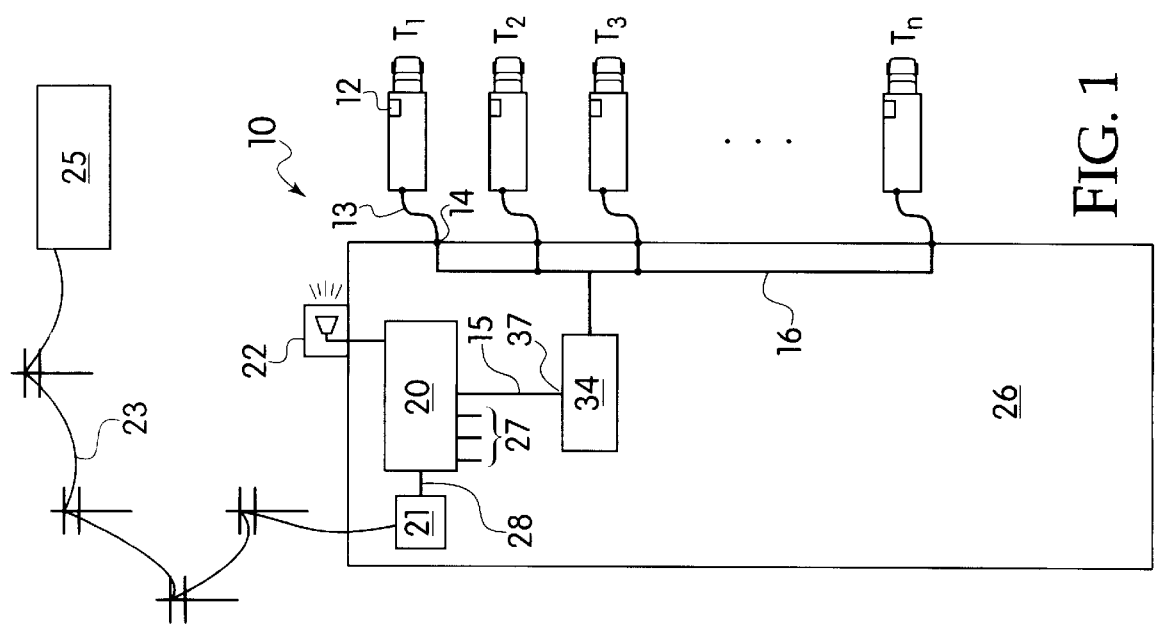
FIG. 1 is an overview of a commercial building using the present invention.

Turning now in detail to the drawings, FIG. 1 shows an integrated vehicle and building alarm system 10 for protecting the contents of a plurality of vehicles 11. Alarm system 10 comprises a vehicle alarm 12 which is capable of detecting the unauthorized entry of an intruder into protected vehicle 11. Vehicle alarm 12 is connected to a building alarm 20 by an attachment cable 13. In a preferred embodiment, a plurality of intruder signal lines 16 connect attachment cables 13 to a plurality of input ports 36 located on a junction box 34. In addition, junction box 34 contains at least one output port 37, and at least one switch to connect input port 36 with output port 37. At least one alarm signal line 15 is electrically connected between output port 37 and a building alarm 20.

The standard building alarm device is capable of monitoring several building zones 27 which correspond to protected areas such as windows, doors, motion detectors, etc. Each zone corresponds to an alarm signal line. As with most common building alarm devices, a continuous closed circuit exists while all protected areas are secured. Whenever a protected zone is disturbed, a switch is opened and breaks the continuity of the circuit. The open condition on any one of these signal lines will generate an alert signal 28, and trigger an alarm horn 22 and an automatic telephone dialer 21. Automatic telephone dialer 21 then contacts a central monitoring station 25 via telephone lines 23, and broadcasts either a general intrusion alert or a prerecorded message. If an intrusion is detected in vehicle 11, a similar audible alert will sound vehicle alarm 12.

Figure 2A:
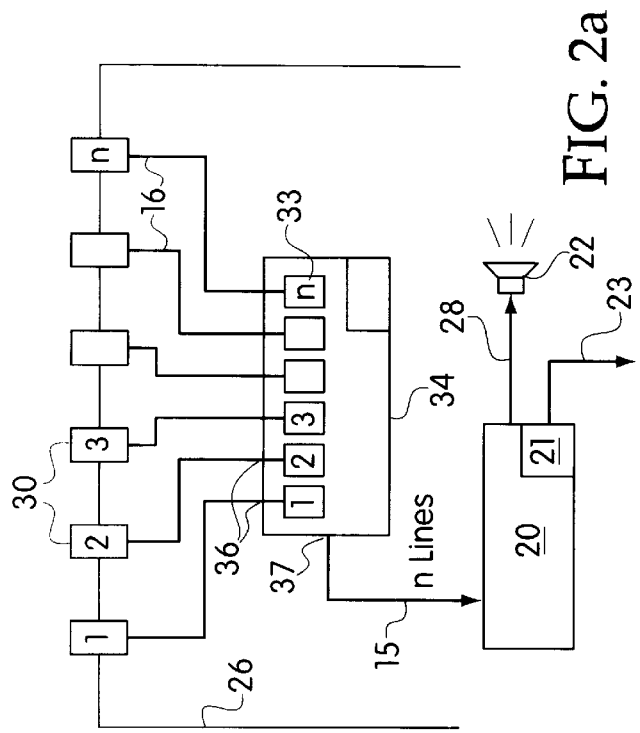
FIG. 2a is an overview of the system's components located inside the commercial building.

FIG. 2a is a view of the preferred embodiment and shows a portion of the components of the integrated vehicle and building alarm system which are located inside a building. The system comprises a plurality of female connectors 30 disposed on the outside wall of building 26. Intruder signal lines 16 are electrically connected on one side to female connector 30 and electrically connected on a second side to a plurality of arming switches 33. Arming switches 33 are located in junction box 34, and correspond to each of female connectors 30. It is to be understood that several different configurations of arming switches and female connectors are possible, and the input lines can even be directly connected to building alarm 20. Arming switches 33 in an open position, simulate a closed circuit as if vehicle 11 is connected and secured. This feature allows the system to be activated when a vehicle is not present. When arming switch 33 is closed, it completes an electrical connection between input port 36 and output port 37 thereby connecting alarm signal line 15 to intruder signal lines 16. Junction box 34 may be used to reduce the number of input signals from the plurality of intruder signal lines 16, to a select number of output alarm signal lines 15. In addition, junction box 34 is powered via a transformer 32. It is understood that any number of signal lines 15, from 1 to N are possible depending upon the available number of input zones on building alarm device 20. When an alarm event is detected on any of the input zones, an alert signal 28 is generated and activates alarm horn 22 and automatic telephone dialer 21. In this manner, the intruder would be alerted that the appropriate authorities have been contacted and possibly deter additional damage to vehicles 11.

Figure 2B:
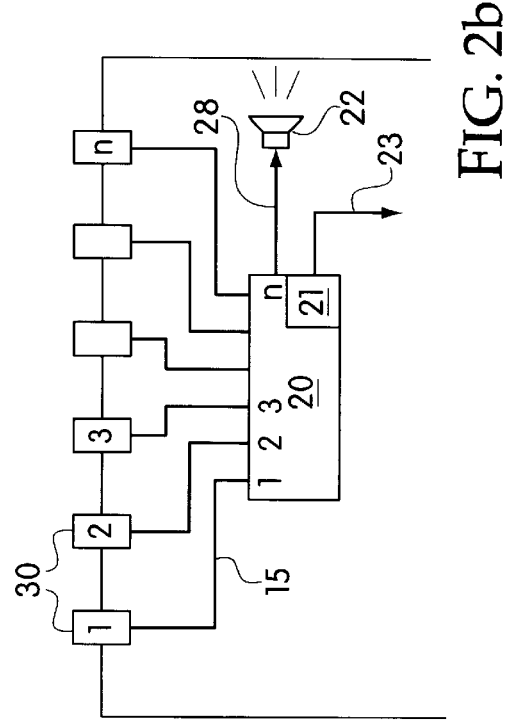
FIG. 2b is an overview of the system's components located inside the commercial building of an additional embodiment.

FIG. 2b shows an additional embodiment of the integrated vehicle and building alarm system 10 whereby each intruder signal line 16 corresponds to a protected zone signal line 15 on building alarm system 20. This configuration provides a quick determination of which vehicle 11 has been entered.

FIG. 3 shows a three-dimensional view of vehicle 11 attached to building 26. Attachment cable 13 further comprises a male connector 14 disposed on at least one end of cable 13. Female connector 30 is disposed on building 26 and vehicle 11. The female connectors 30 are electrically connected to vehicle alarm 12 and either junction box 34 and switch 33 or directly to building alarm 20. Vehicle 11 further comprises a rear wall 50 having a reinforced side section 51. It is advantageous to locate female connector 30 in reinforced side section 51.

FIG. 4 shows an enlargement of male connector 14 and female connector 30. Male connector 14 further comprises a first conductive region 41 located at a tip 45 of male connector 14. In addition, a circular detent 40 is disposed adjacent tip 45. Detent 40 prevents the accidental removal of male connector 14 from female connector 30. A first insulating region 42 is disposed adjacent detent 40 and opposite tip 45. In addition, a second conductive region 43 is disposed adjacent first insulating region 42 and opposite tip 45. Lastly, a second insulating region 44 is disposed adjacent second conductive region 43 and opposite tip 45. Male connector 14 is inserted into female connector 30 and completes the electrical circuit thereby connecting vehicle 11 to building alarm 20. The use of male/female connectors prevents damage to attachment cable 13 in the event a driver of vehicle 11 forgets to disconnect attachment cable 13 from vehicle 11 prior to departure. The male connector will simply be pulled out of the female connector thereby preventing damage to the system.

In an effort to further deter theft, any tampering with attachment cable 13 will similarly trigger an alarm. First, if attachment cable 13 is removed from either the building or vehicle quick connect female connector 30, an open circuit is produced and detected by building alarm 20. In addition, if attachment cable 13 is shorted, a detector circuit in building alarm 20 detects the change in impedance and triggers an alarm.

While the present invention is discussed having direct wire connections between protected vehicle 11 and building alarm 20, it is understood that the invention could be designed using either infrared transmitters and receivers or radio frequency (RF) transmitters and receivers.

Accordingly, while only two embodiments of the present invention have been shown and described, it is obvious that many changes and modifications may be made thereunto without departing from the spirit and scope of the invention according to the appended claims.

What is claimed is:

1. An integrated vehicle and building alarm system for protecting at least one vehicle located adjacent a building, comprising:

at least one vehicle alarm device, located within the vehicle, having means for detecting an intrusion into the vehicle, means for producing an audible alert in response to said intrusion, and means for activating an alarm signal when said intrusion occurs;

a building alarm device having a plurality of input ports corresponding to a number of protected zones, said building alarm device located within the building, having means for detecting said alarm signal on said input ports and having means for generating an alert signal when said alarm signal occurs;

a junction box having at least one input port and at least one output port, said junction box comprising a plurality of switches each having a first position for coupling the vehicle alarm device to the building alarm device and a second position for simulating the coupling of the vehicle alarm device to the building alarm device when no vehicle is present;

an attachment cable, electrically connected between said vehicle alarm device and said input port of said junction box;

at least one alarm signal line electrically connected between said output port of said junction box and said input port of said building alarm device; and alert means for drawing attention to the area of the intrusion, electrically connected to said building alarm device, wherein said alert means is actuated by said alert signal generated by said building alarm device.

2. The integrated vehicle and building alarm system according to claim 1, wherein said means for detecting an intrusion further comprises:

a magnetic-reed switch mounted on said vehicle in proximity to a door of said vehicle; and means for holding said magnetic-reed switch in an electrically closed position, wherein said means comprises a magnet mounted on said door of said vehicle.

3. The integrated vehicle and building alarm system according to claim 1, wherein said means for detecting an intrusion further comprises:

a magnetic-reed switch mounted on said vehicle in proximity to a window of said vehicle; and means for holding said magnetic-reed switch in an electrically closed position, wherein said means comprises a magnet mounted on said window of said vehicle.

4. The integrated vehicle and building alarm system according to claim 1, wherein said attachment cable further comprises quick connect/disconnect means located on one end of said attachment cable for easy attachment and detachment from said vehicle alarm device.

5. The integrated vehicle and building alarm system according to claim 4, wherein said quick connect/disconnect means further comprises:

a male phonograph connector having an electrically conductive tip and a circular detent located adjacent said tip, wherein a first conductive region includes said tip and said circular detent;

a first insulating region located adjacent said circular detent and opposite said tip;

a second conducive region located adjacent said first insulating region and opposite said tip; and a second insulating region located adjacent said second conductive region and opposite said tip, wherein said first and said second conductive regions make electrical connections with a corresponding female connector and said detent provides frictional resistance to prevent accidental removal of said male connector from the female connector.

6. The integrated vehicle and building alarm system according to claim 5, wherein said attachment cable is electrically connected between a first female connector and a second female connector, said first female connector is electrically connected to said vehicle alarm device and said second female connector is electrically connected to said input port on said junction box.

7. The integrated vehicle and building alarm system according to claim 6, wherein the vehicle further comprises a rear wall, said rear wall having a reinforced side region and said first female connector is located within said reinforced side region.

8. The integrated vehicle and building alarm system according to claim 6, wherein said second female connector is located along an outside wall of the building.

9. The integrated vehicle and building alarm system according to claim 1, wherein said alert means for drawing attention to the area of the intrusion further comprises:

an automatic dialer electrically connected to said building alarm and a telephone line, wherein said automatic dialer places a telephone call via said telephone lines to a central monitoring station and notifies them of the intrusion.

10. The integrated vehicle and building alarm system according to claim 1, wherein said alert means for drawing attention to the area of the intrusion comprises a horn.

11. The integrated vehicle and building alarm system according to claim 1, wherein said alert means for drawing attention to the area of the intrusion comprises a flashing light.

12. The integrated vehicle and building alarm system according to claim 1, wherein said junction box flurer comprises:

means for reducing the number of input ports to a selected number of output ports; and a power transformer, electrically connected to said means for reducing said input ports, for amplifying an output signal on said output port.

13. In a building having a building alarm system capable of detecting an alarm event on a plurality of sensors, the system being electrically connected to an automatic dialer for contacting a central monitoring station in the event of an intrusion and an audible alarm device, wherein at least one vehicle contains a vehicle alarm device capable of detecting an alarm event on a plurality of sensors, the improvement comprising;

a switching device coupled to the input of the building alarm system, wherein said switching device is located in close proximity to the vehicles, said switching device comprising a plurality of switches each having a first position for coupling the vehicle alarm device to the building alarm system, and a second position for simulating the coupling of the vehicle alarm device to the building alarm system when no vehicle is present; and detachable means for connecting the vehicle alarm device to said switching device, so that when said vehicle alarm device is activated, the building alarm system detects the activation through said switching device and activates the automatic dialer and audible alarm of the building alarm system.

14. The invention according to claim 13, wherein said switching device further comprises:

a power transformer for providing power to said switching device.

* * * * *